United States Patent [19]

Horikawa

[11] Patent Number: 4,800,269
[45] Date of Patent: Jan. 24, 1989

[54] SCANNING TYPE OPTICAL MICROSCOPE

[75] Inventor: Yoshiaki Horikawa, Hachiouji, Japan

[73] Assignee: Olympus Optical Co., Ltd., Tokyo, Japan

[21] Appl. No.: 65,034

[22] Filed: Jun. 19, 1987

[30] Foreign Application Priority Data

Jun. 20, 1986 [JP] Japan .............................. 61-144353

[51] Int. Cl.[4] ........................................... G01N 21/00
[52] U.S. Cl. ................................... 250/234; 356/444
[58] Field of Search ................... 250/234, 214 C, 235, 250/310, 397; 356/376, 444

[56] References Cited

U.S. PATENT DOCUMENTS 4,373,817 2/1983 Coates ................................. 250/234

OTHER PUBLICATIONS

Coded Apertures and Detectors for Optical Differentiation—Toy Wilson et al, SPIE vol. 232 1980 Intl. Optical Computing Conference (1980) pp. 203-209.

Primary Examiner—Edward P. Westin
Attorney, Agent, or Firm—Cushman, Darby & Cushman

[57] ABSTRACT

In order to make it feasible to obtain a differential phase image having a uniform brightness and good quality, a scanning type optical microscope comprises: a laser light source; an objective lens for collecting, onto an object under observation, a light beam emitting from the laser light source; a scanning light deflector disposed between the laser light source and the objective lens; a light detector comprised of a plurality of photoelectric converters receiving a light from the object and being separated into two sections; a signal processing circuit for calculating the difference between the signals coming from the two sections of the light detector to thereby obtain a differential phase signal; and adjusting means for adjusting the differential phase signal with a signal varying with an image height and being synchronous with the scanning of the light beam.

8 Claims, 7 Drawing Sheets

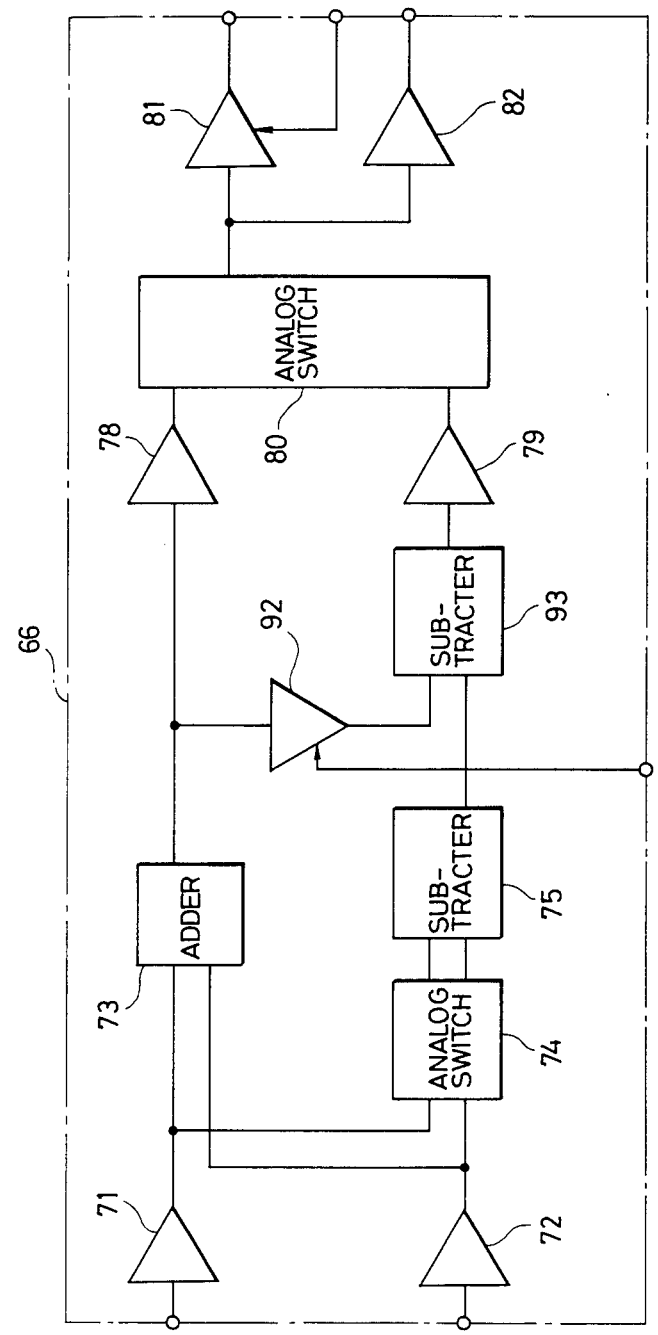

SCANNING TYPE OPTICAL MICROSCOPE

BACKGROUND OF THE INVENTION (a) Field of the invention

The present invention relates to a scanning type optical microscope which is based on the system for conducting the scanning of an object with a beam of light.

(b) Description of the prior art

There have been proposed scanning type optical microscopes which are of many advantages over ordinary microscopes that images of good contrast are obtained because of the absence of scattered lights coming in various other directions than from the picture elements per se which are the target for observation, or that special and effective images can be formed by relying on such techniques as the confocal method or the differential phase difference method, or further that various kinds of physical phenomena can be imaged such as OBIC (Optical Beam Induced Current) images, photo-acoustic images, etc.

As the scanning system employed in the scanning type optical microscopes, there is the system that the specimen for observation is mechanically moved for scanning, and the system that a laser beam spot per se is moved to scan the stationary specimen. In case of the system arranged so that the observation is performed while mechanically moving the specimen, however, there are the drawbacks that the specimens are limited to only those having a small size and a light weight or those which are fixed to inhibit their movement caused by vibrations developing from the scanning operations, and further that the scanning cycles cannot be set at a much high rate. In view of these drawbacks encountered in the prior-art such microscopes, the inventor has proposed, in his U.S. Pat. No. 4,734,578, a scanning type optical microscope which, while being of the system to move the laser beam spot, is capable of forming such special images as obtained from the confocal technique, the differential phase difference technique, etc. and which allows the observation of specimens of any kind.

Description will be made hereunder with respect to this unique system by referring to FIGS. 1 to 5.

This scanning type optical microscope is so arranged that, by introducing into the optical microscope, the system that the surface of the specimen is scanned by deflecting the light beam with a light-deflector, a good convenience of its handling is secured as in the ordinary microscopes while retaining a high degree of resolving power. Also, by setting the light-deflector at the position of the pupil in the scanning optical system, the optical axis in the scanning system can be held constant even when the scanning by the light beam is performed by the light deflector. And, along therewith, by arranging, in case of detection of the transmitted light, the detector at a position conjugate with the pupil, it is made feasible to utilize the informations occurring at the pupil in case of off-axial light rays also. Whereby, it has been made possible to conduct an observation by a mere manipulation of a switch of the electric circuitry even in case of such a special microscopy as mentioned above.

FIG. 1 is an illustration showing the arrangement of the scanning optical system and the detector of the above-mentioned prior art which takes the pupil into consideration. A light beam 1 coming from a laser source which is considered equivalently as the spot light source transmits through a beam splitter 2 and incides onto a first light-deflector 3. This light-deflector 3 is disposed at a position conjugate with the pupil 5 of an objective lens 4. In case no deflection of light is performed, the light beam 1 advances along an optical axis 6. In case light deflection is performed, i.e. in case scanning is performed by the light beam 1, it should be noted that, since the light-deflector 3 is provided at the position of the pupil, the direction of the light beam 1 is rendered to the coincident with that of an off-axial principal ray 7, and the center of the light beam 1 also is rendered to be coincident with the off-axial principal ray 7. Next, in each of these cases, the light beam passes through pupil relay lenses 8 and 9 and incides onto a second light-deflector 10 which is disposed also at the position of the pupil. When this light-deflector 10 is to perform the scanning only in the direction X among the two-dimensional scanning, the first-mentioned light-deflector 3 will undertake the scanning in the direction Y. By the employment of a light-deflector which is capable of performing the deflection of light in both directions X-Y, therefore, the provision of a single light-deflector is enough. The light beam which thus scans in two dimensions by the two light-deflectors 3 and 10 is caused to incide onto the pupil 5 of the objective lens 4 by means of a pupil projection lens 11 and a focusing lens 12. An off-axial light beam which is formed by the light-deflectors 3 and 10 also has its direction and center coincident with the off-axial principal ray 7. Therefore, this off-axial light-beam also impinges exactly onto the pupil 5 of the objective lens 4. And, these light beams develop, on a specimen 13 by the objective lens 4, a dot-like spot of light which is restricted by diffraction. By performing scanning in both directions X and Y by the light-deflectors 3 and 10, a two-dimensional scanning of the specimen 13 by the dot-like light is carried out.

In case the light which has transmitted through the specimen 13 is observed, the light is collected by a condenser lens 14 and the resulting light is detected by a detector 15. This detector 15 also is disposed at the position of the pupil. Accordingly, off-axial lights appear always at a same position, whereby it is possible to prevent the adversary effects caused by, for example, uneven sensitivity of the detector 15. Also, the area for the installation of the detector 15 can be greatly reduced. Furthermore, in case a differential type detection is performed, the detector 15 is formed with two detector-constituent devices 15a and 15b, and they are disposed symmetrically relative to the optical axis 6. In this case, setting is made to establish the condition that, even in the event of an off-axial light, the center of the beam stays coincident with the off-axial principal ray, whereby the detector-constituent devices 15a and 15b assume symmetrical positions relative to the off-axial principal ray also. Thus, it is possible to perform a precise differential type detection.

Also, in case detection is conducted with the reflection light coming from the specimen 13, the light beam which has been reflected at the specimen 13 transmits through the objective lens 4 and its pupil 5, and further passes through a focusing lens 12, and is focused once. This focal plane is the one which is used in ordinary optical microscopes to observe an image. Furthermore, the light beam is caused to return to the light-deflector 10 by the pupil projection lens 11. In this way, the reflection light beam returns to the beam splitter 2 by tracing back exactly the same course as that taken by the beam of light when it initially incided onto the specimen. Therefrom, the reflection beam is derived by the beam splitter 2 to become a detection beam 16. Since the reflection beam has returned after passing through the light-deflectors 10 and 3, an off-axial scanning will not affect this detection beam 16 in any way. The detection beam 16 is then squeezed into a dot-like form by a light-collecting lens 17. Therefore, by the provision of a pin-hole 18 at the position where the beam is squeezed into a dot-like form, and by performing a detection by means of a detector 19 which is located rearwardly of the pin-hole 18, it is possible to obtain a flare-free image of a higher resolution than offered by an ordinary microscope. It will be needless to say that a normal image can be obtained even where the pin-hole 18 is not provided. Also, by the provision of a black dot-like light-blocking member at the position where the light beam is squeezed into a dot form, it is possible to easily observe a dark-field image. Also, by constructing the detector 19 with two detector-constituent devices 19a and 19b, and by disposing them at positions of the expansion of the light beam in symmetrical fashion relative to the optical axis, it is possible to conduct a differential type observation. Here, it will be needless to say that the signal supplied from the detector 19 can be converted to a visible image by such an indicator as a CRT.

Next, description will be made hereunder in further detail with respect to the need for considering the position of pupil in case of the optical system and the detection system for scanning with a light beam. FIG. 2 shows the instance wherein the light-deflector 3 is not provided at the position 20 of pupil in that region of the light-deflector 3 and of the pupil relay lens 8 of FIG. 1. When the incident beam 1 is deflected by the light-deflector 3, the center 21 of this deflected light beam is not coincident with the off-axial principal ray 7 which is determined by the objective lens 4. This indicates that the off-axial light beam does not precisely incide onto the objective lens 4. In FIG. 3, numeral 22 represents the pupil of the objective lens 4. It is shown that the center of this pupil 22 is either the optical axis 6 or the off-axial principal ray 7. In this case, when the light-deflector 3 is provided at a position conjugate with the pupil, the scanned off-axial light beam coincides with the off-axial principal ray 7, and it precisely incides onto the pupil 22 of the objective lens 4. In contrast thereto, when the light-deflector 3 is not provided at the position of the pupil, the center 21 of the light beam is not coincident with the off-axial principal ray 7, so that the expansion 23 of the light beam becomes as shown in FIG. 3, and this expansion of light beam will be subjected to vignetting without exactly impinging onto the pupil 22. In this case, by arranging the incident beam to be a large light beam like the expansion 23', there will not arise a shortage of the amount of light, but nevertheless this is not appropriate for utilizing the pupil informations.

Next, description will be made of the instance wherein the detector is not provided at the position of the pupil in the detection of the transmitted light. In FIG. 4, the light beam is projected in a dot form onto a specimen 25 by an objective lens 24, and the transmitted light beam is detected by detectors 27 and 28 which are disposed symmetrically relative to an optical axis 26. In case of the system for conducting the scanning by moving the specimen, the light beam is always located on the optical axis. Therefore, it is always possible to perform the differential type detection. However, in case of scanning with a light beam by means of a light deflector, there occur off-axial lights. Therefore, unless the detectors are provided at the position of the pupil, the positions of the detectors 27 and 28 will not become symmetrical relative to the off-axial principal ray 29. As shown practically in FIG. 4, the off-axial principal ray 29 is produced on the detector 28. Accordingly, it is not possible to obtain an accurate differential image. From the foregoing description, in the scanning type optical microscope using the system of conducting the scanning with a light beam, there is the necessity for setting a light-deflector at the position of the pupil of the optical system and for providing a detector also at the position of the pupil. By so arranging, special microscopy can be accomplished easily, and also there can be obtained an image of a high resolution. However, as is apparant from the foregoing description, it should be noted that, in case detection is performed with a reflection light, this reflection light again passes through the light-deflector, so that there is no restriction on the position of the detector.

The above-mentioned example of the prior art is so arranged that, also in the system of scanning with a laser beam spot by the provision of a scanning means (light-deflector) and a detector at the position of the pupil, there can be obtained an accurate differential phase image. In case, however, the microscope to which this sysem is applied is an ordinary optical microscope, it is the usual case that the position of the pupil of the objective lens differs depending on the magnification or the type of the objective lens. Therefore, in case the scanning means and the detector are set in accordance with the position of the pupil of a given objective lens, there would occur the instance, when a different objective lens is used, that the detector becomes displaced from the position of the pupil. Also, there could occur a displacement of the position of the pupil arising from the setting error of the detector or from the restrictions of placement of the detector. For this reason, the amount of light of the light beams incident to the two detectors intended for the detection of differential phases, e.g. the detectors 15a and 15b of FIG. 1, will vary, respectively, depending on the height of the image as shown in FIGS. 5A and 10B.

Let us here consider the case that, for example, the two detectors have their sizes which are substantially larger than the size of the projected pupil. Assuming that the radius of the pupil as p, the amount of displacement of the pupil from the optical axis as $\delta$, and the amount of light when there is no displacement of pupil as 1. Then, the amount of light $f(\delta)$ will become:

$$f(\delta) = \frac{2}{\pi} \left\{ \cos^{-1}\frac{\delta}{p} - \frac{\delta}{p} \sqrt{1 - \left(\frac{\delta}{p}\right)^2} \right\} \tag{1}$$

Here, when the sum of the output signals of these two detectors is calculated to obtain a normal image, these two signals cancel out each other so that there will develop no change in the amount of light attributable to the image height. In case, however, it is intended to obtain a differential image, the difference between the output signals of the two detectors is calculated. Thus, the change in the amount of light due to the image height will become doubled. In this latter case, there arises the inconvenience that, when, for example, the direction of the boundary line between the two detectors is set normal to the direction of the horizontal scanning, i.e. in case arrangement is given so as to obtain a differential image in the direction of the horizontal scanning, the brightness will differ on the left-hand side of the picture field from the right-hand side thereof.

Such a difference of brightness between the areas on the two sides of the picture field will not cause a substantial problem in case the image height is small or where the contrast of the differential image is not stressed. In case, however, the image height is big or in case the contrast of the differential image is to be stressed, the abovesaid unevenness of the brightness will conistute a substantial problem. For example, there could arise such an inconvenience that the left-hand margin of the picture field is excessively bright so that the details of the differential image are lost, whereas the right-hand margin is too dark and nothing can be observed.

SUMMARY OF THE INVENTION

It is, therefore, a primary object of the present invention to provide a scanning type optical microscope incorporating the above-described system, which is capable of securing a uniform brightness at all points on the entire picture field, whereby an excellent differential phase image can be obtained.

According to the present invention, the scanning type optical microscope is of the arrangement comprising: a light source; an objective lens for collecting the light beam emitting from the light source onto an object; light beam scanning means disposed between said light source and said objective lens; a detector comprised of a plurality of photo-electric converters receiving the light coming from the object; a signal processing circuitry connected to said detector for calculating the difference between the signals coming from each of the divided two sections of said detector to thereby obtain a differential phase signal; adjusting means connected to the signal processing circuitry to use a signal varying with an image height, that is, a position where the object is irradiated by the light beam, and being synchronous with the scanning of the light beam to thereby adjust the differential phase signal, whereby to cancel out, by the adjustment signal, the bias component of the differential phase signal which varies with the image height.

This and other objects as well as the features and the advantages of the present invention will be apparent from the following detailed description of the preferred embodiments when taken in conjunction with the accompanying drawings.

BRIEF DESCRIPTION OF THE DRAWINGS

FIG. 3 is an illustration showing the instance wherein a detector is not provided at the position of the pupil.

FIG. 13 is an illustration showing a detailed arrangement of the signal processing circuitry somewhat different from that shown in FIG. 9.

DESCRIPTION OF THE PREFERRED EMBODIMENTS

Prior to describing the embodiments of the present invention, the principle for obtaining a differential phase image will be explained.

On page 203 of "Proceeding of SPIE" vol. 232, issued in 1980, T. Wilson et al state that a differential phase image can be detected in the scanning type optical microscope. Now, for the sake of simplicity, one dimensional image is considered. The intensity I(x) of an image due to a partial coherent focusing is indicated, in general, as follows.

$$I(x) = \int \int\int_{-\infty}^{\infty} C(m;p) \, T(m) \, T^*(p) \quad (2)$$

$$\exp 2\pi j \, \{(m - p)x\} \, dmdp$$

wherein:

T(m) represents Fourier conversion function of the transmittibity of an object; and C(m;p) corresponding to the transmission function of the optical system.

When the sensitivity of the detector is assumed to be $D(\xi)$, and when the pupil function of the optical system is assumed to be $P(\xi)$, then $$C(m;p) = \int_{-\infty}^{\infty} D(\xi) \, P(\lambda fm - \xi) \quad (3)$$

$$P^*(\lambda fp - \xi)d\xi$$

wherein:

f represents the focal distance of the optical system; and

λ represents the wavelength of light.

Figure 6:
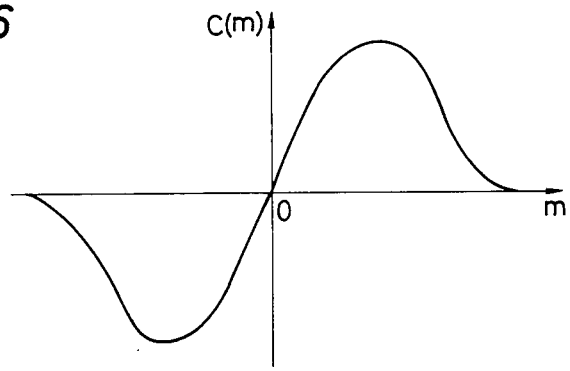
FIG. 6 is a chart of the transmission function of the optical system of the scanning type optical microscope.

Here, when an object having a weak contrast is taken up, it is enough to consider only C(m;0). Accordingly, assuming $D(\xi)$ as the sensitivity of the split detector-constituent devices, the difference in the output signals from these respective detector-constituent devices will be considered, and we shall get a C(m;0) in such a configuration as mentioned in FIG. 6. The fact that the function of transmittibity has such a configuration indicates that a differential of phase of an image can be obtained. Also, by utilizing the sum of the output signals coming from the respective detector-constituent devices, a normal image is obtained. As stated above, there is the feature that a differential image or a normal image can be obtained selectively only by the selection of use of the difference in the output signals or the sum of these signals.

Here, in case it is intended to obtain such a differential image as stated above, a displacement of the position of pupil as mentioned earlier in this specification will result in the development of a change in the amount of light due to the height of the image.

Figure 7:
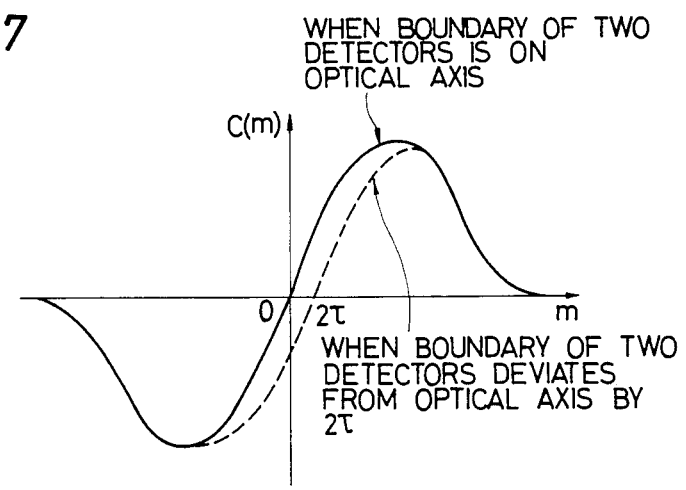
FIG. 7 is a chart of the transmission function in case the boundary between the two detector-constituent devices is displaced from the optical axis of the optical system.

Now, let us here assume that the boundary of the two detector-constituent devices is displaced by $2\tau$ from the optical axis. Then, the image intensity $I\tau(x)$ will become $$I\tau(x) = \int \int_{-\infty}^{\infty} (m - 2\tau_m + p - 2\tau_p)T(m)T^*(p)\exp 2\pi j(m - p)x\, dm\, dp$$

$$= \int \int_{-\infty}^{\infty} (m + p)T(m)T^*(p)\exp 2\pi j(m - p)x\, dm\, dp$$

$$-2(\tau_m + \tau_p)\int \int_{-\infty}^{\infty} T(m)T^*(p)\exp 2\pi j(m - p)x\, dm\, dp \quad (4)$$

and there is developed an overlying of a differential image upon a normal image. Here, the first member of the right-hand term of the above-mentioned Equation (4) represents a differential phase image, whereas the second member thereof represents a normal image. Therefore, the resulting image will be one formed with a normal image superposed on the differential phase image at the rate of $2(\tau m + \tau p)$. In case the amount of displacement of the boundary between the two detector-constituent devices from the optical axis is small, the normal image signal will be only very trifle, so that the image which is obtained may be safely considered as being nothing else but a differential phase image. FIG. 7 shows the transmission function $C(m;0)$ in the above-mentioned instance. Also, a differential phase image is required mostly in case of observation of a phase object. Therefore, usually, it is often the case that a normal image signal constitutes a mere bias component for a differential phase image.

What becomes the problem, therefore, is the unevenness in the amount of light when a differential phase signal is utilized. However, by the addition of such an offsetting component as will cancel out the unevenness of the amount of light to the difference signal intended for the differential phase signals, relying on the characteristic that an electrical offset is an offset of the electric signal subsequent to image focusing and that this does not affect the image focusing in any way, it is possible to uniformalize the brightness of the entire picture field.

Therefore, the present invention provides for the arrangement that an image having a uniform brightness is obtained by the addition of an adjustment (brightness uniformalizing) signal (offsetting component) in synchronism with the scanning to the differential signal of the two detector-constituent devices which varies in accordance with the image height, that is, a position where the object is irradiated by the light beam, as to cancel out the bias component of this differential signal.

Description will be made hereunder in further detail with respect to the present invention based on an embodiment thereof by giving reference to FIGS. 8 to 10.

Figure 8:
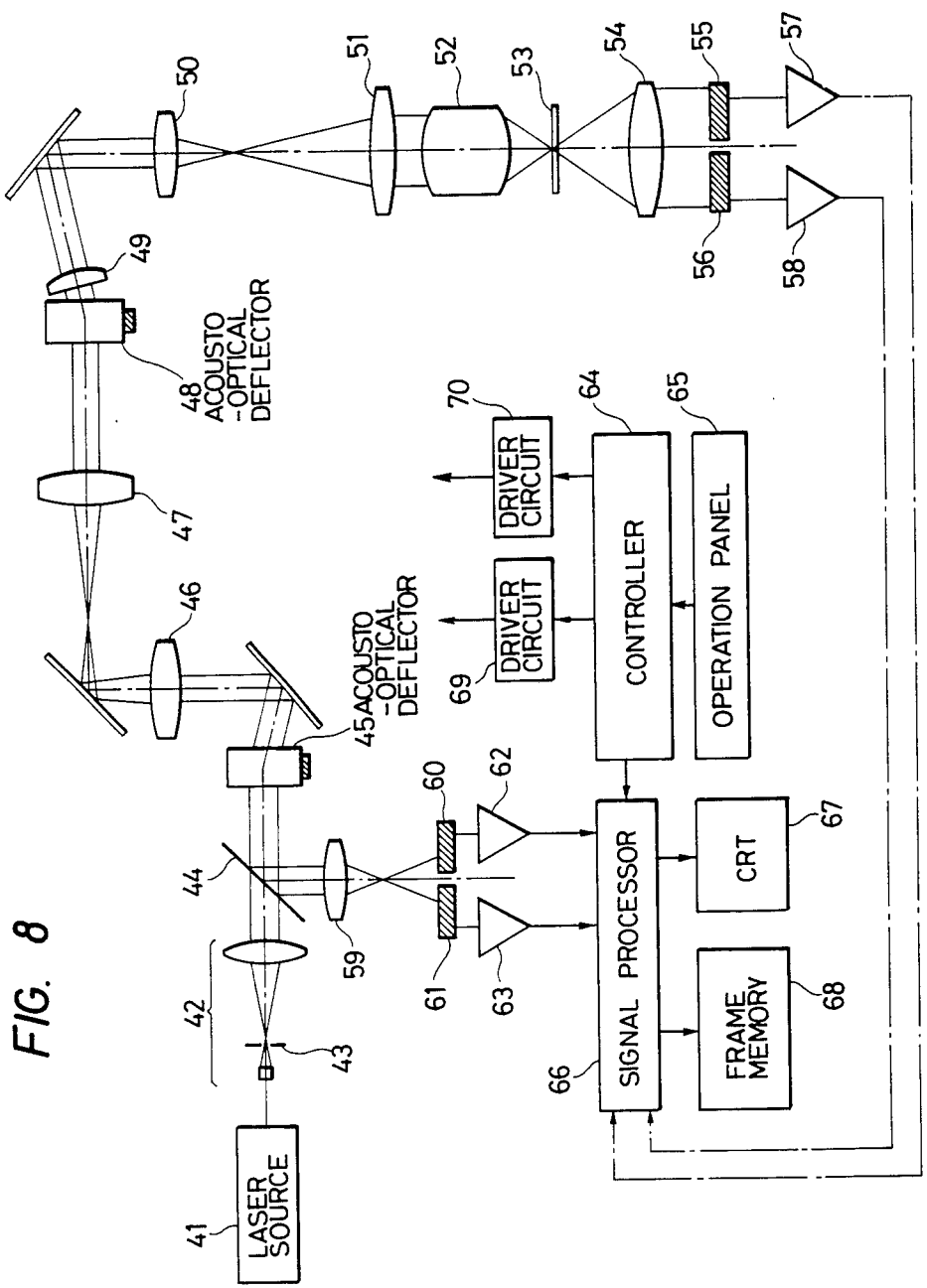
FIG. 8 is an illustration showing the structure of an embodiment of the scanning type optical microscope according to the present invention.

FIG. 8 shows a scanning type laser microscope using two AODs (Acousto-Optical Deflectors) serving as light deflectors, i.e. the light beam scanning means. Numeral 41 represents a laser source. Its light is shaped into an appropriate light bundle by a beam expander 42 including a spatial filter 43 (notes: this is intended to render the light from the laser source into a single mode beam, and for example, a pin-hole is employed for this purpose). The light passes through a beam splitter 44 and incides onto an AOD 45 (for vertical direction), and is caused to impinge onto a next AOD 48 (for horizontal direction) by pupil relay lenses 46 and 47, and the resulting beam transmits through a pupil projection lens 50 and a tube lens 51, and impinges onto an objective lens 52. And, the light which has passed through a specimen 53 is converted to a signal by means of a collector lens 54, two detector-constituent devices 55, 56 and amplifiers 57, 58. Also, the reflection light coming from the specimen 53 travels backwardly along the same course which the incident light has followed, and is reflected by the beam splitter 44 to be formed into a signal by a detector lens 59, two detector-constituent devices 60, 61 and amplifiers 62, 63. Numeral 64 represents a manually operable controller; 65 and operation panel; 66 a signal processor; 67 a CRT; 68 a frame memory; 69, 70 driver circuits for AODs 45, 48, respectively.

It should be noted here that the boundary between the detector-constituent devices 55, 56 and the boundary between the detector-constituent devices 60, 61 are each normal to the horizontal scanning direction, and that the differential signal represents the differential in the horizontal direction.

Figure 9:
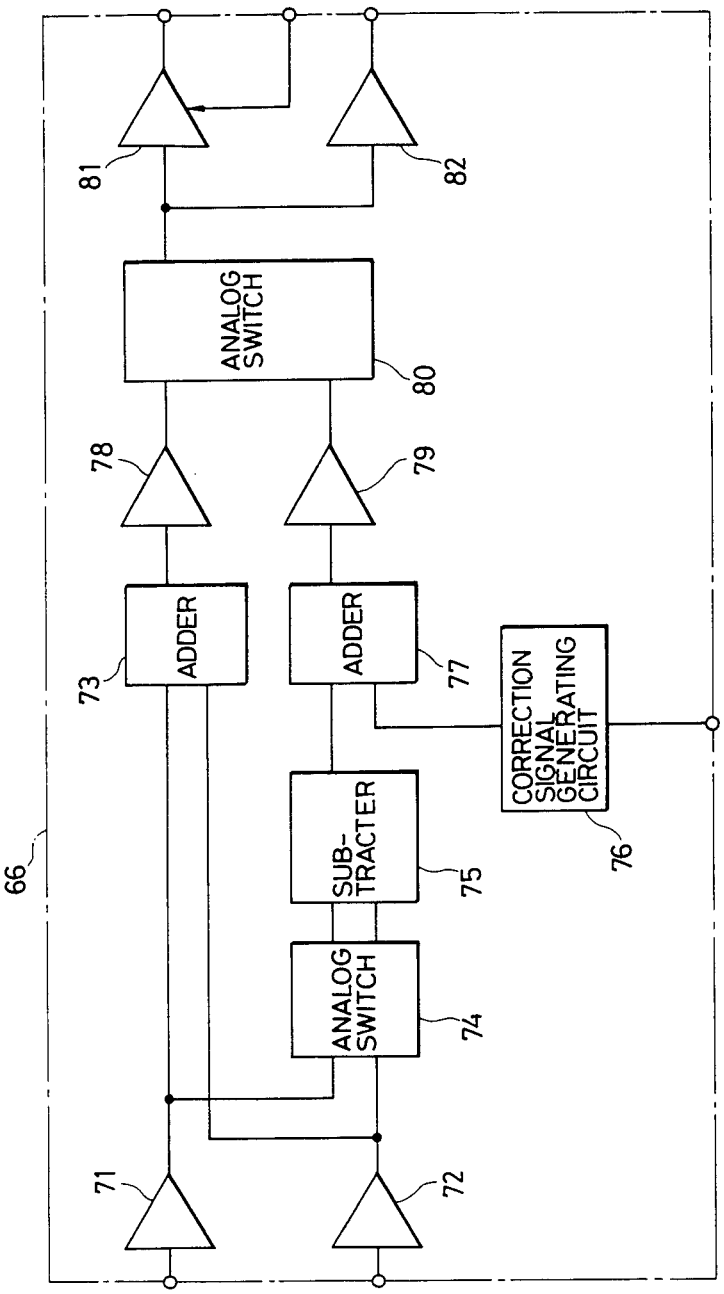
FIG. 9 is an illustration showing the detailed arrangement of the signal processing circuitry in FIG. 8.

The signal processing circuit 66 has an arrangement as shown in FIG. 9. Numerals 71, 72 represent buffer amplifiers which receive image signals supplied from the detector-constituent devices 55, 56 or 60, 61 through the amplifiers 57, 58 or 62, 63. Numeral 73 represents an adder of two signals for obtaining a normal image; 74 an analog switch which determines a code for the subtraction between the two signals; 75 a subtracter for obtaining a difference signal to obtain a differential image; 76 an adjustment signal generating circuit which generates an adjustment signal in synchronism with a horizontal synchronous signal coming from the controller 64 (notes: herein this circuit generates a saw-tooth wave), to thereby adjust its magnitude; 77 an adder for adding the adjustment signal to the difference signal; 78, 79 contrast-adjusting amplifiers having variable gains and offsetting functions, respectively, and serve to adjust the contrast thereof. It should be noted here that, in the differential signal processing circuit, adjustment of contrast is done after an adjusting, i.e. after uniformalizing the brightness of the entire picture field. Hence, there is no need to change the amount of adjustment, i.e. the amount of the uniformalized brightness. Numeral 80 denotes an analog switch for selecting the signal which is to be displayed; 81 a buffer amplifier for adding, to an image signal, the synchronous signal intended for video purpose and supplied from the controller 64 to form a composite video signal; and 82 a buffer amplifier for outputting the image signal exactly as it is.

Figure 1:
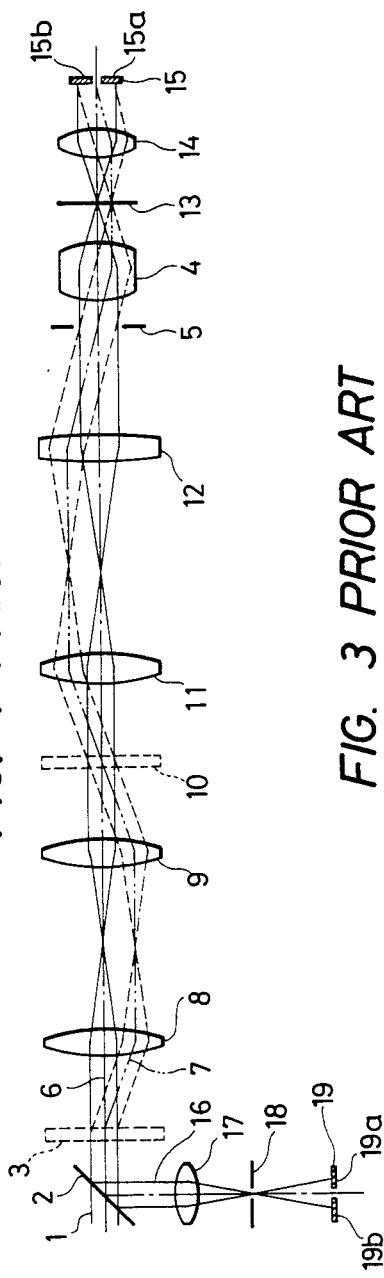
FIG. 1 is an illustration showing an example of the optical system of the conventional scanning type optical microscope.
Figure 3:
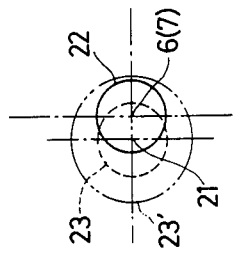
FIGS. 2 and 3 are illustrations showing the instances, respectively, in the conventional example of FIG. 1 wherein a light deflector is not provided at the position of the pupil.
Figure 4:
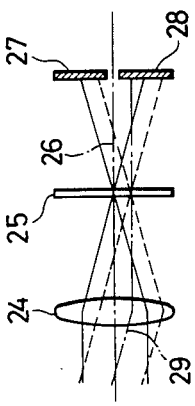
Figure 2:
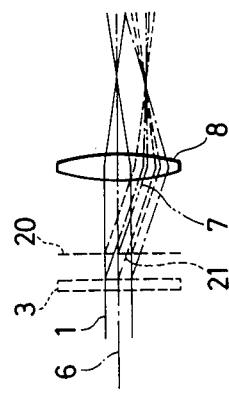
Figure 5A:
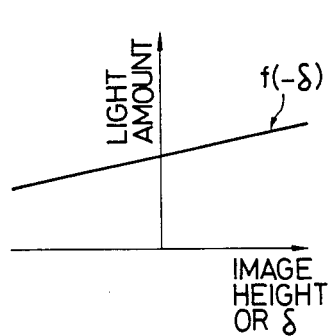
FIGS. 5A and 5B are illustrations showing the relationship between the image height and the amounts of light incident onto the two detector-constituent devices in the conventional example of FIG. 1 wherein the detector is displaced from the position of the pupil.
Figure 5B:
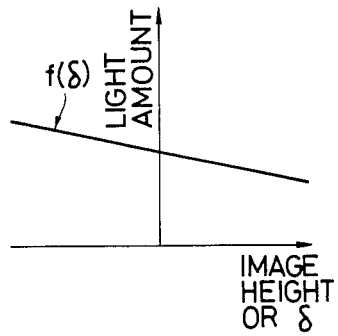
Figure 10:
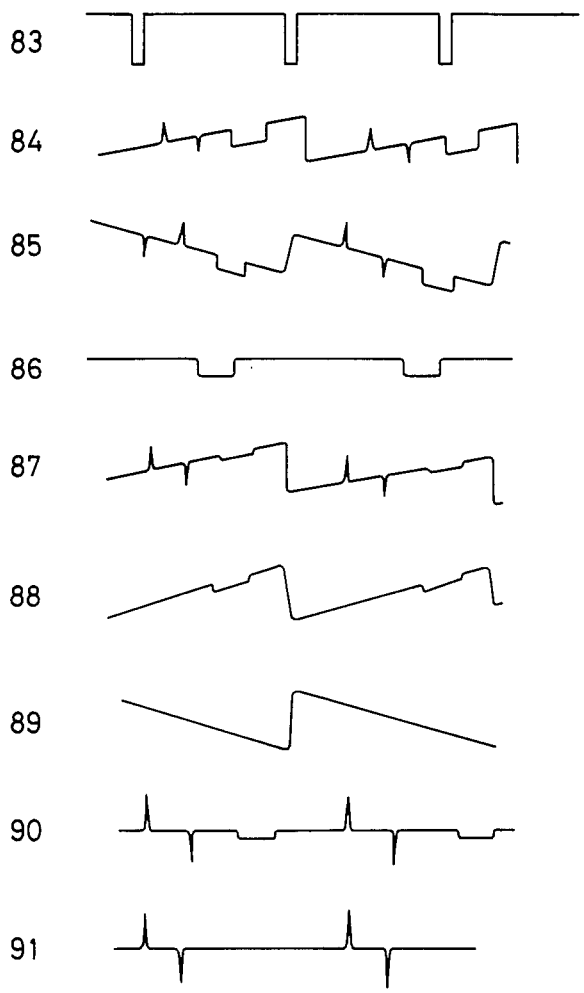
FIG. 10 is an illustration showing the manner of adjustment of a signal in the embodiment of FIG. 8.
Figure 11:
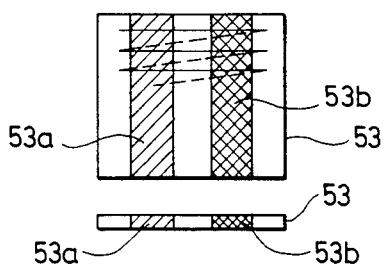
FIG. 11 is an explanatory illustration of an object under observation.

FIG. 10 shows the manner of adjusting the signal. FIG. 11 shows a specimen, i.e. an object 53 requiring observation. In this Figure, the hatched portion 53a shows the region having a same transmittibity as that of its surrounding area but having a different refractive index from said surrounding area, whereas the region 53b of the obliquely crossed lines indicates the region having a same refractive index as that of its surrounding area but a lower transmittibity than said surrounding area. An instance wherein this object 53 is scanned as illustrated (notes: the broken lines indicate the returning lines) will be described below by giving reference to FIG. 10. "83" represents a horizontal synchronous signal. "84", "85" represents signals coming from two detector-constituent devices 55, 56 or 62, 63, respectively. As shown in FIGS. 5A and 5B, a bias component is superposed on the image signal in accordance with the image height (horizontal scanning). Numeral "86" represents a sum signal for a normal image, in which the bias component has been cancelled out and an altogether normal image is obtained. It should be noted here that, as a matter of course, the hatched region 53a in the object 53 has a transmittibity equal to that of its surrounding area, so that this portion does not appear in the normal image signal. Numeral "87" represents a difference signal for the differential phase image obtained by subtracting the signal "85" from the signal "84". By this signal subtraction, the differential phase signal increases its magnitude, but at the same time therewith the bias component also is doubled in magnitude. Also, there remains a normal signal only for the amount $2(\tau m + \tau p)$. Therefore, when such an adjustment signal as the one "89" (an offsetting signal) is added to the signal "87", there is obtained a differential phase signal as indicated by "90". Accordingly, it becomes possible to secure a uniform brightness at all points on the picture field, and thus there can be obtained an excellent differential phase image.

Figure 12:
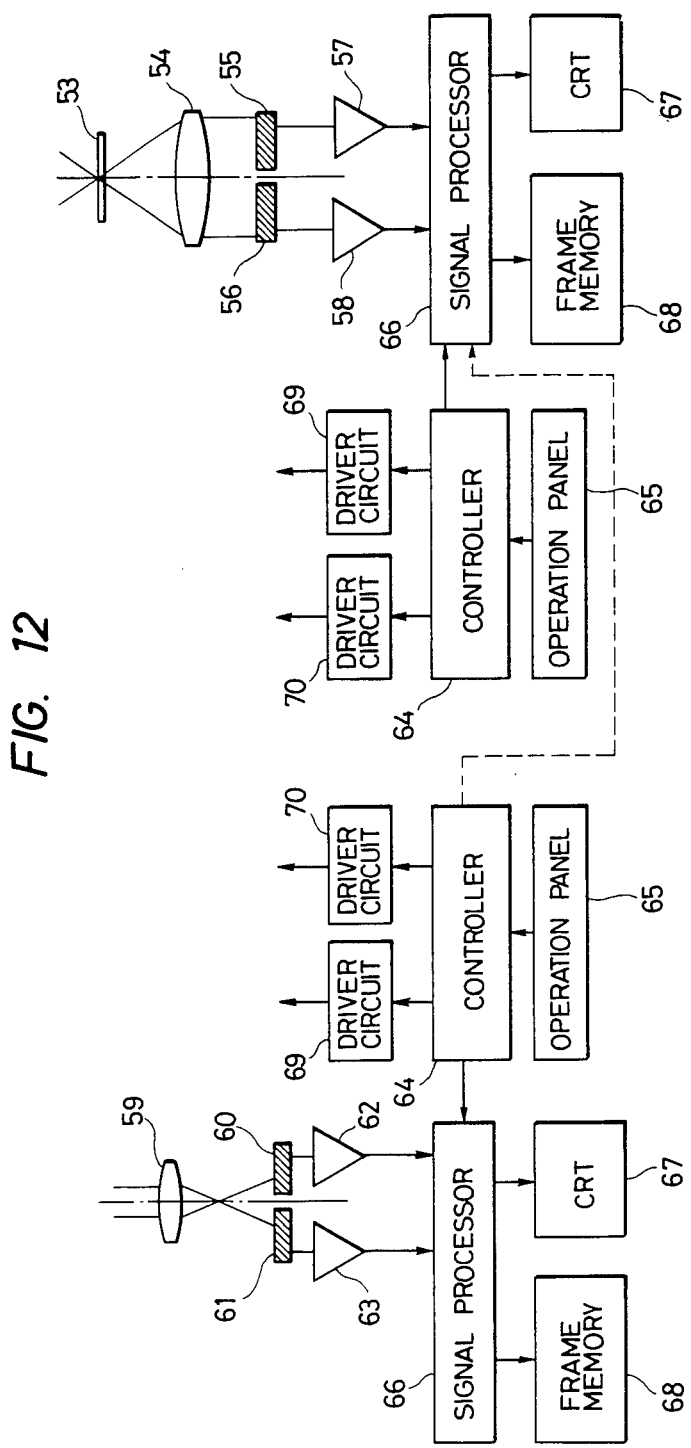
FIG. 12 is a partial illustration showing the arrangement of another embodiment of the present invention.

Description has been made above with respect to the instance wherein detection is performed by the use of a reflection light coming from the specimen or object 53. It is needless to say that detection can be made also with the light which has transmitted through the specimen 53. In this latter case, the transmitted light is received by the detector-constituent devices 57, 58. However, the output signals from these devices are inputted to the signal processor 66 as shown by the chain line in FIG. 8, and they are processed in a manner similar to the instance using the deflection light, and are adjusted. That is, in the embodiment shown in FIG. 8, both the signal processing circuit and the signal adjusting means, i.e. the controller 64, the operation panel 65, the signal processor 66, the CRT 67, the frame memory 68 and the driver circuits 69, 70 are arranged so as to be used in common for the detection conducted with the reflection light and also for the detection conducted with the transmitted light, so as to be utilized in alternative fashion. In contrast thereto, FIG. 12 shows the embodiment wherein there are employed signal processing circuit and signal adjusting means both of which are independent from those used in the instance wherein detection is conducted with the reflection light, relative to the instance wherein detection is performed with the transmitted light. In this latter embodiment also, the construction and the function of these circuit and means are the same as those described above, and accordingly like parts described already are assigned with like reference numerals, and their description is omitted. In this instance embodiment, it is possible to use only the signal adjusting means in common as indicated by the dotted line in FIG. 12. This arrangement is suitable for making a simultaneous observation of such a specimen as having both a light-reflecting region and a light-transmitting region.

It should be noted here that a similar effect can be obtained also from multiplication and division of the adjustment signal, in addition to the addition and subtraction of such a signal. Also, as a matter of course, the signals "84" and "85" may be adjusted independently in advance.

It should be noted here also that, while there is shown in this embodiment an instance wherein adjustment is performed manually by utilizing the controller 64, arrangement may be provided to perform an adjustment in such a way that while preliminarily conducting an observation of a uniform specimen, a signal of non-uniform amount of light is inputted in the computer so that, for example, using the inverse number of this signal as the adjustment coefficient, and by dividing with this adjustment coefficient the signal produced at the time the specimen is observed actually, or that, using the signal per se which comes from the uniform specimen to serve as the adjustment data, and by subtracting at a certain constant rate this data from the signal produced from the actual observation of the specimen.

Also, as described earlier, a difference signal is provided as an image signal such that a differential phase image and a normal image are superposed one upon the other at a rate dependent on the image height (meaning: the positional displacement of the boundary of the detector-constituent devices which divide the pupil into two sections). Therefore, by subtracting the normal image signal due to the sum signal from the difference signal at the above-mentioned rate, to retain only the perfect differential phase component, and further by performing the so-called shading adjustment in accordance with the developing output intensity, there can be made a perfect adjustment.

It should be noted that, as shown as "90" in FIG. 10, according to the above-described adjustment system, the normal image signal complying with the displacement of the boundary line of the two detector-constituent devices from the optical axis is mingled in the differential phase image signal. In case this is obstructive, the normal image signal "86" is amplified or diminished into an appropriate magnitude in advance, and then it is subtracted from the signal "90", whereby there can be obtained a differential phase image signal "91" which has been adjusted more perfectly. FIG. 13 shows an example of the signal processing circuit 66 for carrying out such an adjustment. In this instant embodiment, like reference numerals are assigned to those circuit-constituent parts similar to those shown in FIG. 9. That is, arrangement is provided so that a portion of the output from an adder 73 is inputted, along with the difference signal "90", to a subtracter 93 via a variable gain amplifier 92. The variable gain amplifier 92 is operative so that its gain is controlled by such a signal which varies with the image height as the saw-tooth signal which is synchronous with, for example, a horizontal synchronous signal, so that the output thereof will become such one as indicated by "88" in FIG. 10. By subtracting this signal from the difference signal "90" by the subtracter 93, there is produced a differential phase signal which has been adjusted perfectly.

What is claimed is:
1. A scanning type optical microscope, comprising:
a light source;

an objective lens for collecting a light beam emitting from said light source onto an object;

light beam scanning means disposed on an optical axis lying between said light source and said objective lens for scanning the surface of the object with a light beam;

at least one light detecting means disposed for receiving a light from said object and separated into a first section and a second section;

calculating means connected to said light detecting means for calculating a difference signal of output signals coming from the first section and the second section of said light detecting means; and adjusting means connected to said calculating means for adjusting said difference signal with a signal varying with a position where said object is irradiated by said light beam and being synchronous with the scanning of said light beam to thereby obtain a differential phase signal of the object.

2. A scanning type optical microscope according to claim 1, wherein:

said light detecting means comprises a first detector for receiving a reflection light coming from said object and a second detector for receiving a transmitted light coming from said object, said first and second detectors are each separated into said first section and said second section, and said calculating means is connected in common to said first and second detectors.

3. A scanning type optical microscope, comprising:
a light source;
an objective lens for collecting a light beam emitting from said light source onto an object;
light beam scanning means disposed on an optical axis lying between said light source and said objective lens for scanning the surface of said object with a light beam;
a plurality of light-detecting means disposed to receive a light coming from said object and each being separated into a first section and a second section;
a plurality of calculating means connected to said plurality of detecting means, respectively, each calculating a difference signal of an output signal delivered from each of the first section and the second section of respective said light detecting means; and
adjusting means connected in common to said plurality of calculating means for obtaining a differential phase signal of the object by adjusting said difference signal with a signal varying with a position where said object is irradiated by said light beam and being synchronous with the scanning of said light beam.

4. A scanning type optical microscope, comprising:
a light source;
an objective lens for collecting a light beam emitting from said light source onto an object;
light beam scanning means disposed on an optical axis lying between said light source and said objective lens for scanning the surface of said object with a light beam;
a plurality of light detecting means disposed to receive a light coming from said object and each being separated into a first section and a second section;
a plurality of calculating means connected to said plurality of detecting means, respectively, each calculating a difference signal between output signals delivered from the first section and the second section of each of said light detecting means; and a plurality of adjusting means connected to said plurality of calculating means, respectively, for obtaining a differential phase signal of said object by adjusting a difference signal with a signal varying with a position where said object is irradiated by said light beam and being synchronous with the scanning of said light beam.

5. A scanning type optical microscope according to claim 3 or 4, wherein:
said calculating means comprises a first and a second buffer amplifier each receiving an image signal coming from said first section and from said second section;
a first adder connected to said first and second buffer amplifiers to obtain a normal image of said object;
a subtracter connected to said first and second buffer amplifiers via an analog switch to obtain a differential image of said object; and
a second adder connected to said subtracter and to an adjustment signal generating circuit.

6. A scanning type optical microscope according to claim 1 or 2, wherein:
said calculating means comprises a first and a second buffer amplifier receiving an image signal coming from said first section and from said second section; a first adder connected to said first and second buffer amplifiers to obtain a normal image of said object; a subtracter connected to said first and second buffer amplifiers via an analog switch to obtain a differential image of said object; and a second adder connected to said subtracter and to an adjustment signal generating circuit.

7. A scanning type optical microscope, comprising:
a light source;
an objective lens for collecting a light beam emitting from said light source onto an object;
light beam scanning means disposed on an optical axis lying between said light source and said objective lens for scanning the surface of the object with a light beam;
at least one light detecting means disposed for receiving a light coming from said object and separated into a first section and a second section;
difference signal forming means connected to said light detecting means for forming a difference signal of output signals coming from the first section and the second section of said light detecting means;
sum signal forming means connected to said light detecting means to form a sum signal of the output signals coming from said first section and said second section;
adjustment signal forming means connected to said sum signal forming means to form an adjustment signal by varying the magnitude of said sum signal in accordance with a position where said object is irradiated by said light beam; and
adjusting means connected to said adjustment signal forming means to for a differential phase signal by adjusting said difference signal with said adjustment signal.

8. A scanning type optical microscope according to claim 7, wherein:
said light detecting means comprises a first detector for receiving a reflection light coming from said object and a second detector for receiving a transmitted light coming from said object,
said first and second detectors are each separated into said first section and said second section, and
said difference signal forming means is connected in common to said first and second detectors.

* * * * *